United States Patent [19]
Ishikura et al.

[11] Patent Number: 5,105,113
[45] Date of Patent: Apr. 14, 1992

[54] PERMANENT-MAGNETIC MOTOR HAVING ANTI-COGGING STRUCTURE

[75] Inventors: HisatugU Ishikura; Seiji Yamashita, both of Katsuta, Japan

[73] Assignees: Hitachi, Ltd., Tokyo; Hitachi Automotive Engineering, Ltd., Ibaraki, both of Japan

[21] Appl. No.: 561,814

[22] Filed: Aug. 2, 1990

[30] Foreign Application Priority Data

Aug. 14, 1989 [JP] Japan .................................. 1-207980

[51] Int. Cl.⁵ .......................................... H02K 21/30
[52] U.S. Cl. .................................................. 310/154
[58] Field of Search ............... 310/154, 156, 67 R, 310/162, 269

[56] References Cited

U.S. PATENT DOCUMENTS

| | | | |
|---|---|---|---|
| 4,556,809 | 12/1985 | Beisse et al. | 310/162 |
| 4,713,569 | 12/1987 | Schwartz | 310/156 |
| 4,748,359 | 5/1988 | Yahara et al. | 310/156 |
| 4,774,426 | 9/1988 | Mohr et al. | 310/154 |
| 4,935,655 | 6/1990 | Ebner | 310/154 |

FOREIGN PATENT DOCUMENTS

| | | | |
|---|---|---|---|
| 136944 | 6/1988 | Japan | 310/154 |
| 140644 | 6/1988 | Japan | 310/156 |
| 294244 | 11/1988 | Japan | 310/156 |

*Primary Examiner*—Steven L. Stephan
*Assistant Examiner*—D. L. Rebsch
*Attorney, Agent, or Firm*—Antonelli, Terry, Stout & Kraus

[57] ABSTRACT

A permanent-magnetic motor employs a skew structure in an armature iron core and an equal gap structure. A center line of a permanent magnet field pole is disposed to be shifted against a mechanical center line of the motor or a center line of the iron core. The magnet field pole is made to have an unequal pitch. A cogging torque generated at both end extending portions in the magnets is cancelled out. The cogging torque of the permanent-magnetic motor in power steering assistance such as for the automobile yields a smooth steering feeling sensitivity during the operation of the automobile.

10 Claims, 8 Drawing Sheets

LENGTH DIFFERENCE BETWEEN ARMATURE IRON CORE AND PERMANENT MAGNET

PERMANENT-MAGNETIC MOTOR HAVING ANTI-COGGING STRUCTURE

BACKGROUND OF THE INVENTION

The present invention relates to a permanent-magnetic motor and, more particularly to a permanent-magnetic direct current electric motor for use in an electric driven power steering apparatus such as in an automobile In the present invention, this direct current electric motor comprises a field pole composed of a permanent magnet. The permanent-magnetic motor utilizing the permanent magnet as a field pole is employed as a power steering force assistance means in the electric driven power steering apparatus for use in the automobile.

In the permanent-magnetic motor having permanent magnets as field poles, torque necessary for rotating the motor fluctuates, even when an armature does not receive any electric current supply. This torque fluctuating variation is called cogging torque.

In such a case the cogging torque occurs in the permanent-magnetic motor, and the cogging torque is transmitted to steering in the automobile which is connected to the permanent-magnetic motor, this fact makes an operator of the automobile feel an unnatural force.

Figure 10A:
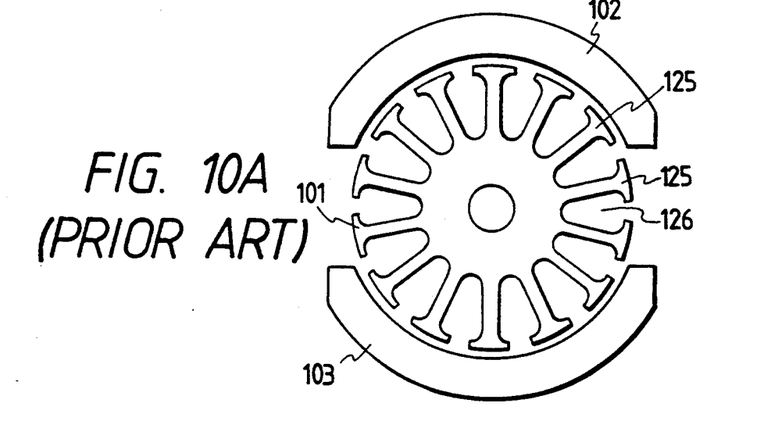
FIGS. 10A, 10B and 10C are schematic views showing a position relationship between the armature iron core teeth and the permanent magnets in the permanent-magnetic motor according to the prior art employing the skew method.
Figure 10B:
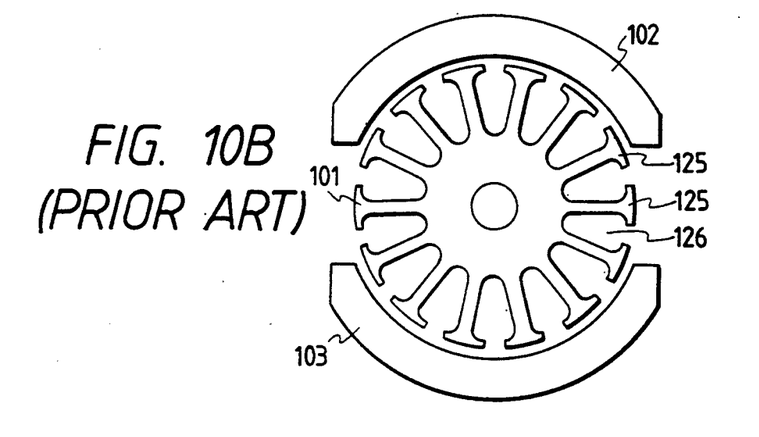
Figure 10C:
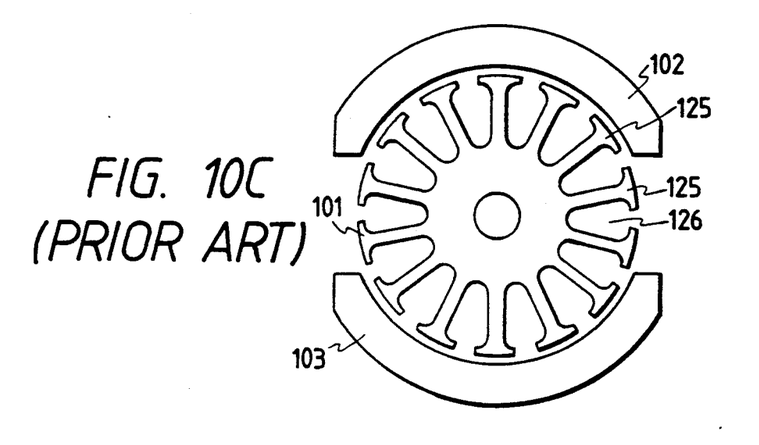

The above stated cogging torque results from the difference in the magnetic attraction force in the permanent-magnetic motor. Such a difference in the magnetic attraction force is caused due to the difference in a position relationship between a permanent magnet 102 and a permanent magnet 103 and teeth 125 of an armature iron core 101 as shown in FIGS. 10A, 10B and 10C. A plurality of slots 126 are formed between adjacent teeth 125.

In particular, in case the permanent-magnetic motor has double-pole composed of the permanent magnets 102 and 103 and the number of slots 126 of the motor is an even number, the armature iron core 101 rotates from a first position shown in FIG. 10A and advance to a second position shown in FIG. 10B. The armature iron core 101 rotates further and is made to be positioned at a third position shown in FIG. 10C.

Figure 11:
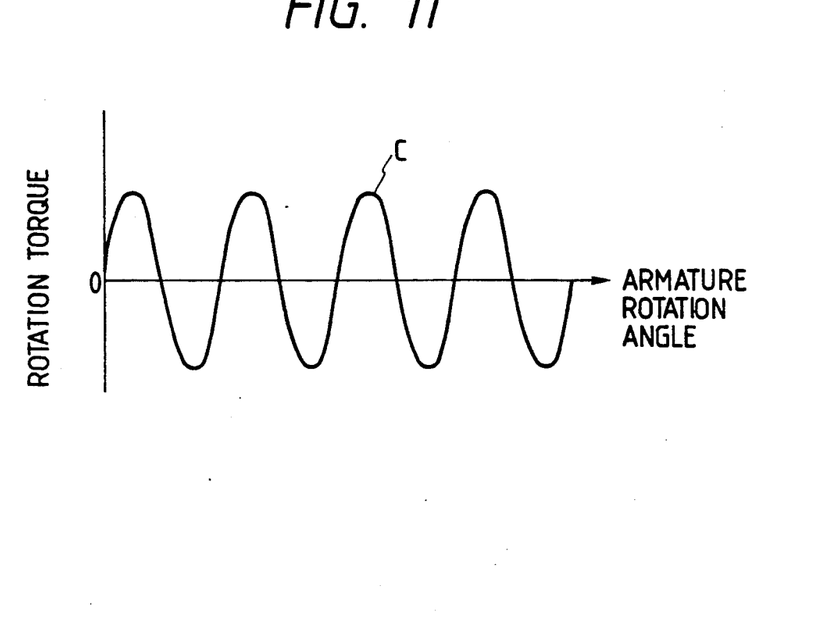
FIG. 11 is a characteristic view showing a cogging torque according to the prior art employing the skew method in which a relationship between the armature angular angle and the rotation torque in the permanent-magnetic motor is explained.

The large torque fluctuation or the cogging torque indicated by a curve line C shown in FIG. 11 occurs in the above stated period during which the armature iron core 101 rotates from the first position to the third position via the second position.

A technique about a reduction for the cogging torque in the permanent-magnetic motor has been developed, for example shown in Japanese Patent Laid-Open No. 30956/1986. This conventional permanent-magnetic motor technique employs a skew method in which the teeth 125 of the armature iron core 101 and the slots 126 between the teeth 125 are skewed as shown in FIG. 7.

Figure 7:
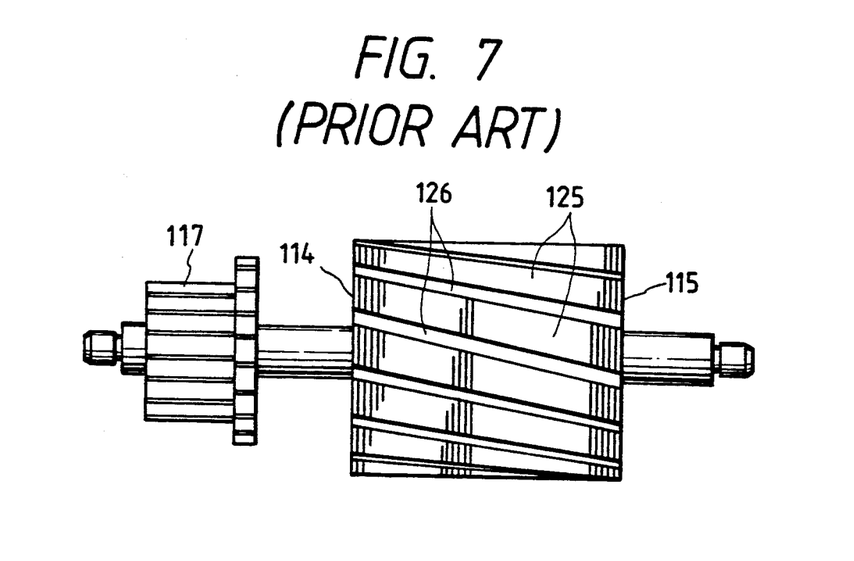
FIG. 7 is a constructional view showing the armature with the commutator in the permanent-magnetic motor according to the prior art in which the skew method is applied to the armature iron core.
Figure 8:
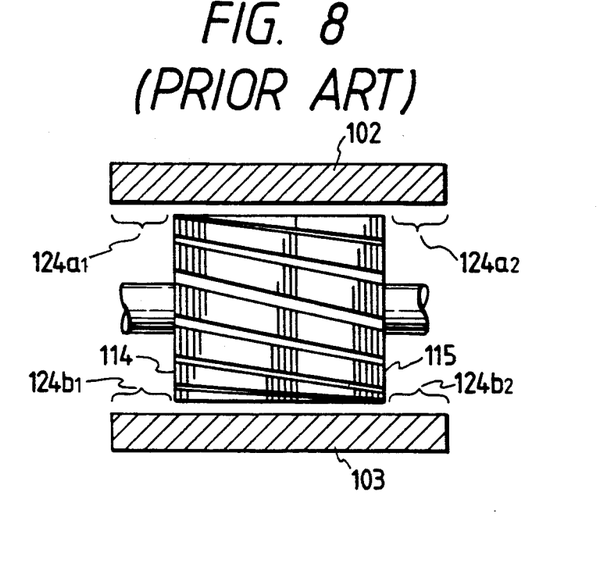
FIG. 8 is a schematic view showing a position relationship between the armature iron core and the permanent magnets in the permanent-magnetic motor according to the prior art employing the skew method.

In case of the permanent-magnetic motor employing a stew of one slot pitch, for example, the position relationship between an end face portion 114 of the armature iron core 101 at a side of a commutator 117 shown in FIG. 7 and the permanent magnet 102 and the permanent magnet 103 has the first position relationship as shown in FIG. 10A. Then the position relationship between another end face portion 115 of the armature iron core 101 at a side opposite the commutator 117 and the permanent magnet 102 and the permanent magnet 103 has the second position relationship as shown in FIG. 10B. Next, the position relationship between the armature iron core 101 and the permanent magnet 102 and the permanent magnet 103 has the third position relationship as shown in FIG. 10C.

The cogging torque indicated by the curve C in FIG. 11 is generate by a change in the magnetic flux is. The change in the magnetic flux is due to a difference between the magnetic flux when a tooth 125 posses end portions of the permanent magnets 102 and 103 and the magnetic flux when a slot 126 passes end portions of the permanent magnets 102 and 103.

In the above stated permanent-magnetic motor employing a skew of one slot pitch, the rapid change in the magnetic flux due to the rotation of the armature iron core 101 or the torque fluctuation is cancelled out at end face portions 114 and 115 and restrained. Accordingly, the cogging torque generated in the permanent-magnetic motor is reduced.

The cogging torque generated in the permanent-magnetic motor can be reduced effectively by adaption of the skew method with the armature iron core 101, but the effect of the skew method is limited to the portions of the armature iron core 101 which correspond to the lengths of the permanent magnets 102 and 103.

In the design for the permanent-magnetic motor employing the permanent magnets 102 and 103 as the field poles, in general, the effective magnetic flux amount is ensured in accordance with the length at the axial direction of the permanent magnet 102 or 103 is made longer than the end face portions 114 and 115 of the armature iron core 101.

The reason why the length at the axial direction of the permanent magnet 102 or 103 is made longer is that the operating point of the ferrite magnet as the permanent magnet 102 or 103 has low gauss at the 3,000 gauss degree, the permanent-magnetic motor is made compact in size according to the concentrating of the magnetic flux by lengthening the permanent magnets 102 and 103 in the axial direction.

Figure 9:
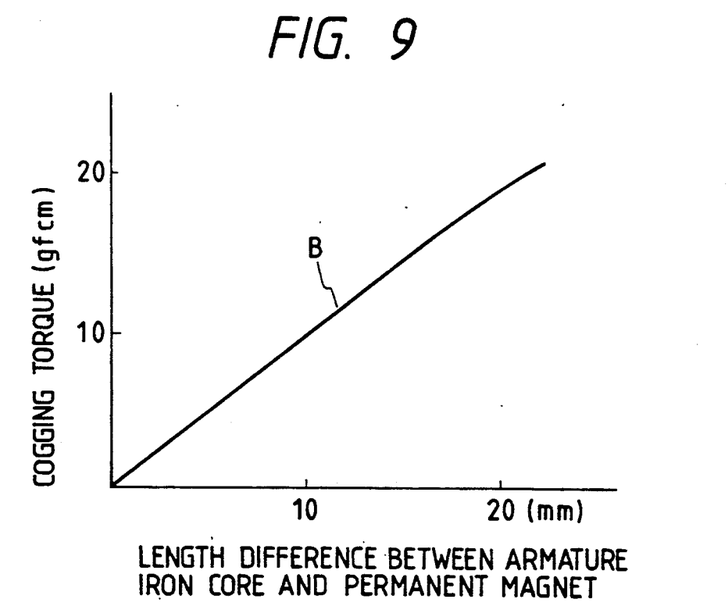
FIG. 9 is a graph showing an example between a difference between the permanent magnet length and the armature iron core length and the cogging torque increase amount according to the prior art employing the skew method.

For above stated reasons, it is necessary that the extending portions 124a1 and 124a2 of the permanent magnet 102 and the extending portions 124b1 and 124b2 of the permanent magnet 103 extend beyond the armature iron core 101 to obtain the advantages afforded by lengthening the permanent magnets 102 and 103. Accordingly, an increase in the cogging torque due to the extending portions 124a1 and 124a2 and 124b1 and 124b2 of the permanent magnets 102 and 103, is represented by a line B as shown in FIG. 9. This cogging torque increase is an increase compared with the case where the length of the armature iron core 101 is equal to the lengths, in the axial directions, of the permanent magnets 102 and 103.

Figure 12:
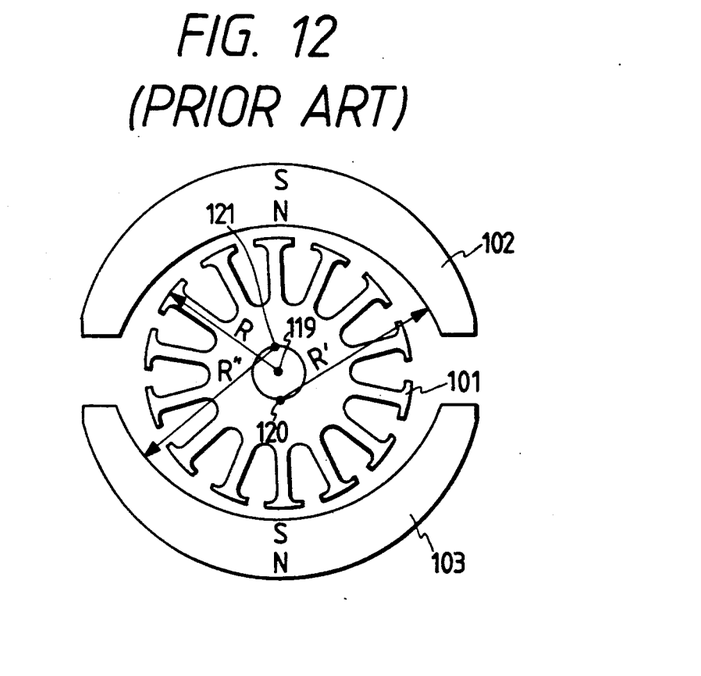
FIG. 12 a schematic view showing a position relationship between the armature iron core teeth and the permanent magnets in the permanent-magnetic motor according to the prior art employing the inequal gap method.

Further, there is another technique for reducing the cogging torque in the permanent-magnetic motor, which is called an inequal or non-uniform gap method. In this inequal gap method in the motor, a center line 119 of a radius diameter R of the armature iron core 101 is shifted against a center line 120 of an inner radius diameter R' of the permanent magnet 102, thereby a gap, which is formed between the armature iron core 101 and the permanent magnet 102, is changed.

Also, the center line 119 of the radius of the armature iron core 101 is shifted against a center line 121 of an inner radius diameter R" of the permanent magnetic 103, thereby a gap, which is formed between the armature iron core 101 and the permanent magnet 103, is changed. The inner radius diameter R' of the permanent magnet 102 has the same dimension of the inner radius diameter R" of the permanent magnet 103.

According to this inequal gap method in the permanent-magnetic motor, for example, the change in the magnetic flux amount and the change in the polarity from the field pole of the permanent magnet 102 magnetized at N pole to the field pole of the permanent magnet 103, which is positioned adjacent and has a reverse polarity (S pole) of the former stated field pole becomes moderate. Accordingly, the cogging torque in the permanent-magnetic motor is reduced.

Figure 13:
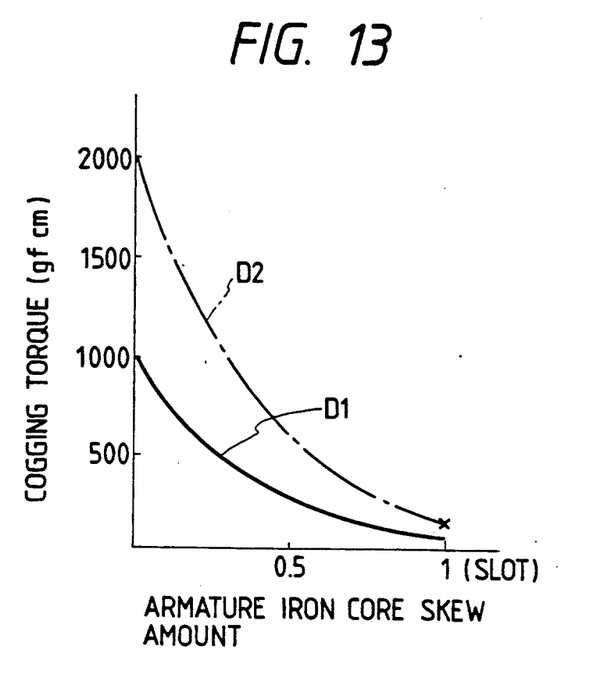
FIG. 13 is a graph showing an example between a measurement example between the armature iron core skew amount and the cogging torque amount according to the prior arts.

FIG. 13 shows a measurement result of the cogging torque with the skew amount of the armature iron core 101 in the permanent-magnetic motor.

In FIG. 13, a solid curve line D1 indicates the cogging torque in which the permanent-magnetic motor comprises the inequal gap structure according to the prior art. A one-dot chain curve line D2 indicates the cogging torque in which the permanent-magnetic motor has the equal gap structure according to the prior art.

Figure 14:
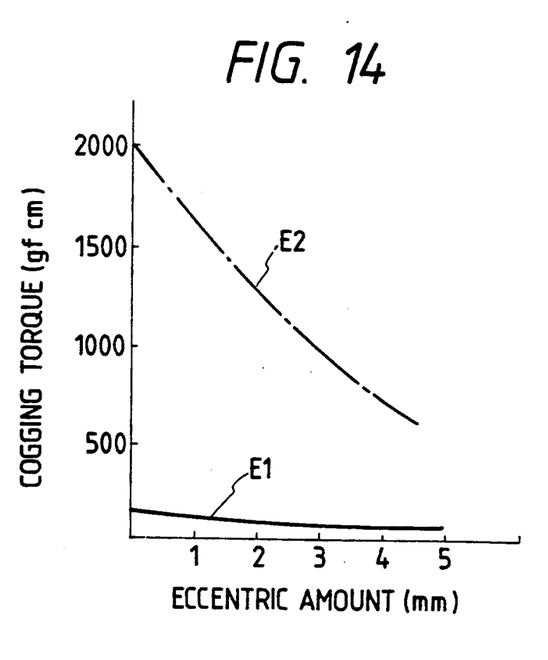
FIG. 14 is a graph showing an example an eccentric amount between the armature iron core and the permanent magnets and the cogging torque amount according to the prior art employing the inequal gap method.

FIG. 14 shows the cogging torque with the eccentric amount between the center line 119 of the armature iron core 101 and the center line 120 of the inner radius diameter R' of the permanent magnet 102 and the center line 121 of the inner radius diameter R" of the permanent magnet 103 in case of the inequal gap method employed in the permanent-magnetic motor.

In FIG. 14, a solid curve line E1 indicates the cogging torque in which the permanent-magnetic motor has a skew of one slot pitch according to the prior art. A one-dot chain curve line E2 indicates the cogging torque in which the permanent-magnetic motor has no skew according to the prior art.

When the length of the armature iron core 101 and the length at the axial direction of the permanent magnet 102 or 103 is made the same, the increase in the cogging torque amount may be avoided. However, with only the combination of the one slot pitch skew method and the inequal gap method, the cogging torque amount cannot be lower than 60 gfcm, because of the size of the permanent-magnetic motor for use in the power steering assistance apparatus in the automobile.

Accordingly, there is a serious problem on the steering feeling sensitivity in which the operator may notice the cogging torque of the permanent-magnetic motor during the power steering operation in the automobile.

SUMMARY OF THE INVENTION

An object of the present invention is to provide a permanent-magnetic motor wherein a cogging torque generated in the permanent-magnetic motor can be reduced effectively.

Another object of the present invention is to provide a permanent-magnetic motor wherein a cogging torque generated at both end extending portions in one field pole and a cogging torque generated at both end extending portions in another field pole having a reverse polarity can be cancelled out.

A further object of the present invention is to provide a permanent-magnetic motor wherein a good steering feeling sensitivity for a power steering apparatus employing the permanent-magnetic motor can be realized.

In accordance with a permanent-magnetic motor of the present invention, at least one of a plurality of permanent magnets is shifted at a rotating direction of an armature so as to cancel a cogging torque out in regard to the plurality of permanent magnets.

In accordance with the present invention, a skew structure in the armature iron core and an inequal gap structure are employed in the permanent-magnetic motor, and further a center line of the permanent magnet field pole is disposed to be shifted against a mechanical center line of the permanent-magnetic motor or a center line of the armature iron core.

Since the center line of the permanent magnet field pole is disposed to be shifted against the mechanical center line of the permanent-magnetic motor, the cogging torque generated at both end extending portions in one permanent magnet field pole and the cogging torque generated at both end extending portions in another permanent magnet field pole having the reverse polarity are cancelled out. Accordingly the cogging torque generated in the permanent-magnetic motor can be reduced effectively.

According to the present invention, since the cogging torque of the permanent-magnetic motor for use in a steering force assistance, such as for the automobile, and the pulsatory motion of the output torque at a time of electric current supply can be reduced, the smooth steering feeling sensitivity during the operation of the automobile can be realized.

DESCRIPTION OF THE INVENTION

One embodiment of a permanent-magnetic motor according to the present invention will be explained refering to the drawings.

Figure 1:
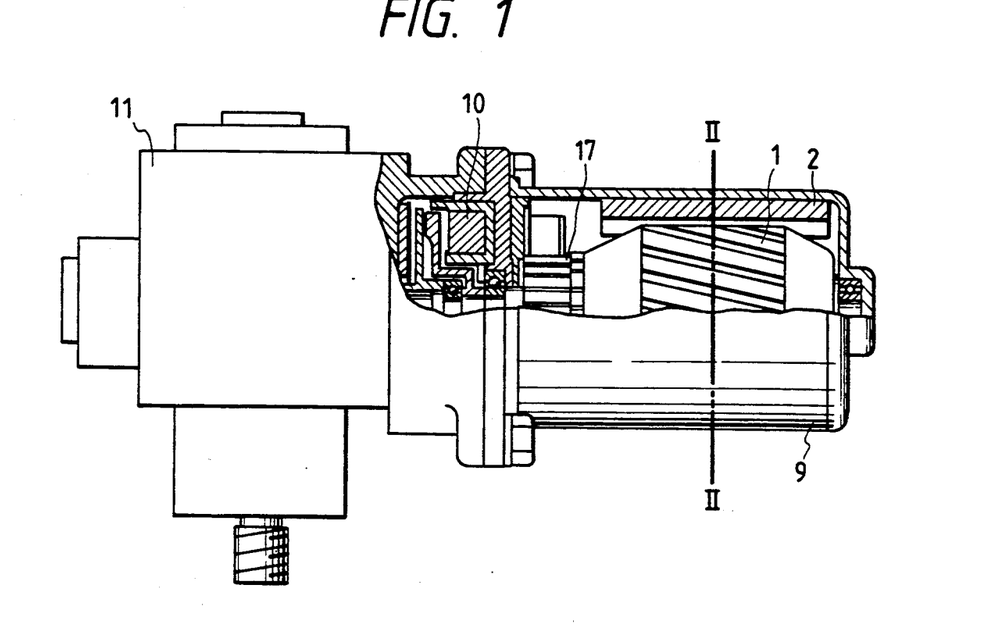
FIG. 1 is a partial cross-sectional view showing a total structure of a driving portion for assisting a power steering force in an automobile in which one embodiment of a permanent-magnetic motor according to the present invention is employed.

FIG. 1 is a total structure view showing a driving portion comprising a double-pole permanent magnet field pole type permanent-magnetic motor 9, a magnetic clutch portion 10, and a reduction gear apparatus 11.

The double-pole type permanent-magnetic motor 9 of this embodiment according to the present invention may be used as a means for assisting the power steering force in the steering of the automobile.

Figure 2:
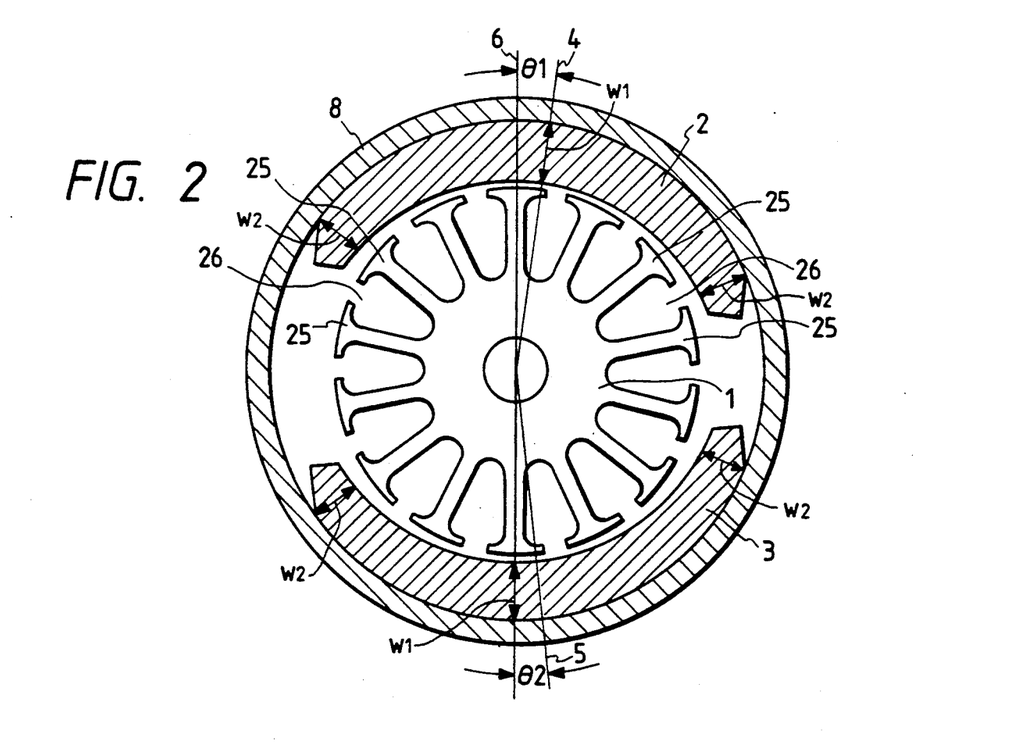
FIG. 2 is a cross-sectional view showing one embodiment of the permanent-magnetic motor according to the present invention taken along a line II—II shown in FIG. 1.

The double-pole type permanent-magnetic motor 9 according to the present invention comprises an armature iron core 1, two ferrite permanent magnets 2 and 3, and a yoke 8 as shown in FIG. 2. The armature iron core 1 has fourteen (14) teeth 25 and fourteen (14) slots 26. The motor 9 has a skew of one slot pitch of an unequal gap structure.

In this embodiment of the permanent-magnetic motor 9 according to the present invention, both a center line 4 of the permanent magnet 2 and a center line 5 of the permanent magnet 3 are disposed to be shifted against a mechanical center line 6 of the permanent-magnetic motor 9 or a center line of the armature iron core 1.

Figure 3:
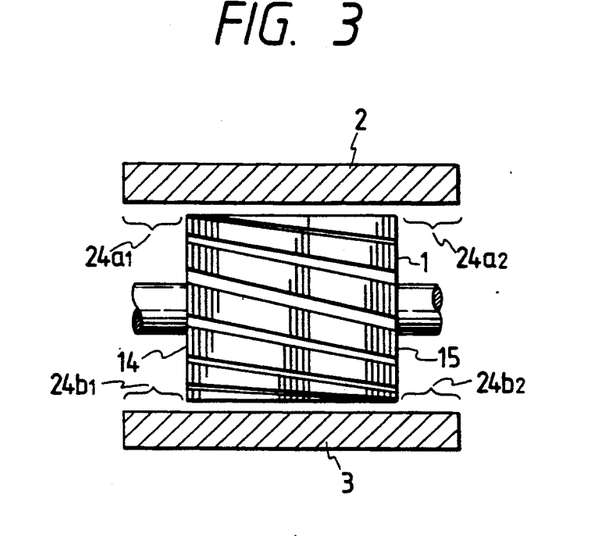
FIG. 3 is a view showing a position relationship between the armature iron core and the permanent magnets in the permanent-magnetic motor according to the present invention.

At the axial directions of the permanent magnets 2 and 3, a position relationship formed between the teeth 25 and the slot 26 against the permanent magnets 2 and 3 is shifted at the extending portions 24a1 and 24a2 and the extending portions 24b1 and 24b2 being out of place the armature iron core 1 as shown in FIG. 3.

In this embodiment of the permanent-magnetic motor 9 according to the present invention, the yoke 8 has an outer diameter of 73 mm and an inner diameter of 67.3 mm, the armature iron core 1 has an outer diameter of 52 mm, and the permanent magnets 2 and 3 has a width (w1) of 7.3 mm at a central portion and a width (w2) of 5.8 mm at both end portions.

The armature iron core 1 has an axial direction length of 45 mm, and is shifted at the extending portions 24a1 and 24a2 having a length of 15 mm and the extending portions 24b1 and 24b2 having a length of 15 mm. The eccentric amount (x), which is defined in the permanent magnets 2 and 3 is 5 mm.

Figure 6:
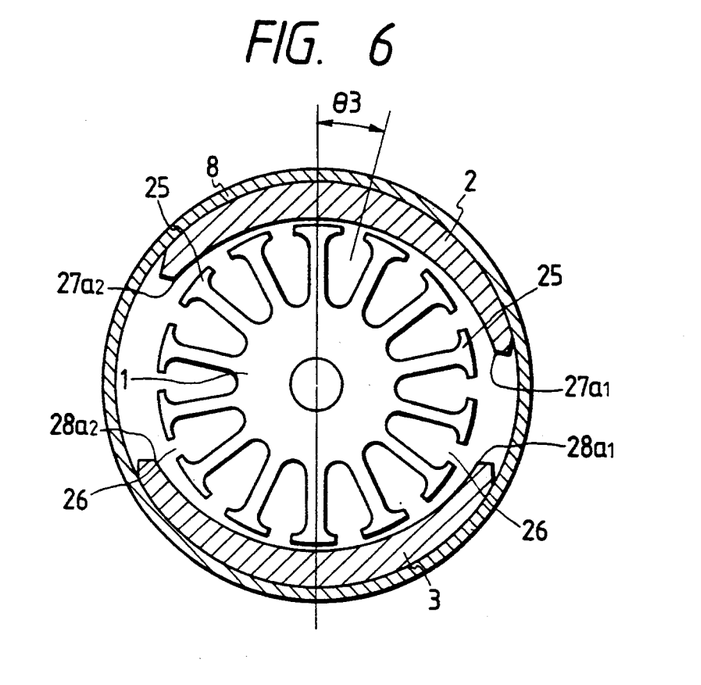
FIG. 6 is a cross-sectional view showing another embodiment of a permanent-magnetic motor according to the present invention.

As to the shift amount defined the mechanical center line 6 of the permanent-magnetic motor 9 and the center line 4 or 5 of the permanent magnet 2 or 3, since the motor 9 has fourteen (14) slots, for example, only one of the permanent magnets 2 and 3 may be shifted by 0.5 slot pitch, namely $(360°/14) \times 0.5 = 12.9°$ from the mechanical center line 6 of the motor 9. This structure will be explained later with respect to another embodiment of the present invention as shown in FIG. 6.

In this embodiment, as a practical matter, it is better that both permanent magnets 2 and 3 each be shifted by 0.25 slot pitch, or $\theta 1 = \eta 2 = 6.4°$ in the case of the above stated example, against the mechanical center line 6 of the motor 9. Besides, the other embodiment of the structure shown in FIG. 6 shows the above stated structure in which only one side of permanent magnet 2 is shifted by 0.5 slot pitch against the mechanical center line 6 of the motor 9.

In this embodiment of the permanent-magnetic motor 9, the armature iron core 1 has one end face portion 14 at a side of the magnetic clutch portion 11 (at a side of a commutator 17) and another end face portion 15 at an opposite side of the magnetic clutch portion 11.

The permanent magnet 2 has the extending portions 24a1 and 24a2 which are being out of the position of the length of the armature iron core 1. The length of the extending portion 24a1 is the same that of the extending portion 24a2. The permanent magnet 3 has the extending portions 24b1 and 24b2 which are being out of the position of the length of the armature iron core 1. The length of the extending portion 24b1 is the same that of the extending portion 24b2.

Figure 4A:
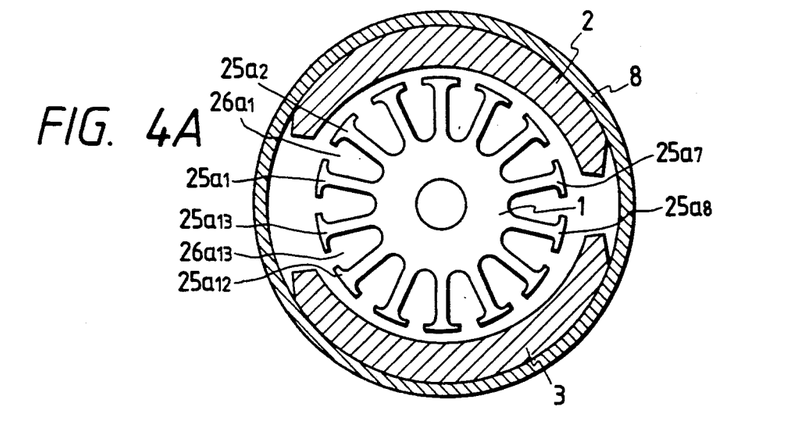
FIGS. 4A, 4B, 4C are schematic views showing a position relationship between the armature iron core teeth and the permanent magnets in the permanent-magnetic motor according to the present invention.
Figure 4B:
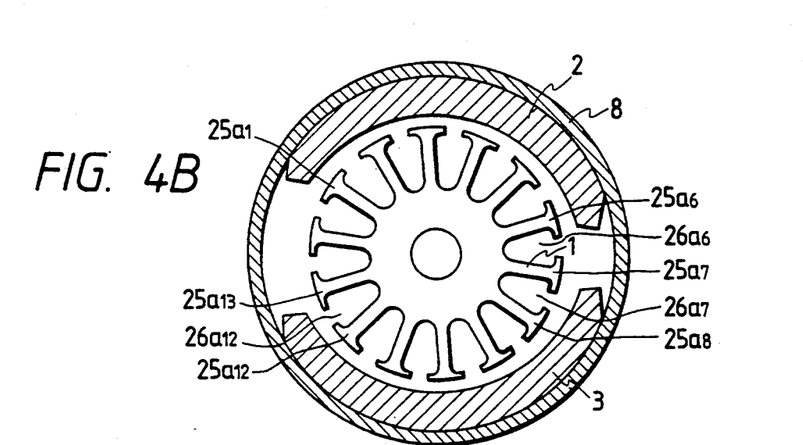
Figure 4C:
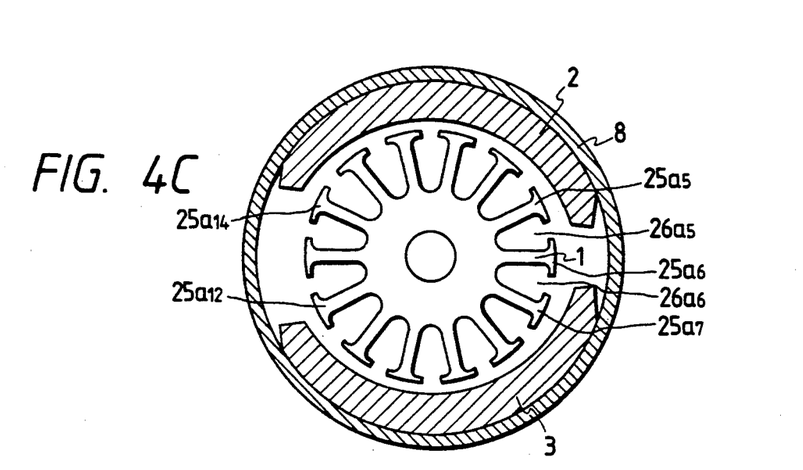

In this embodiment of the permanent-magnetic motor 9, the position relationship between the armature iron core 1 and the permanent magnet 2 and the permanent magnet 3 varies as shown in FIGS. 4A, 4B and 4C, respectively.

A first position relationship is shown in FIG. 4A. Namely, with respect to one end portion of the permanent magnet 2, a central portion between a tooth 25a1 and a tooth 25a2 or a slot 26a1 of the armature iron core 1 is positioned. With respect to another portion of the permanent magnet 2, a center of a tooth 25a7 of the armature iron core 1 is positioned. Besides, with respect to one end portion of the permanent magnet 3, a center of a tooth 25a8 of the armature iron core 1 is positioned. With respect to another end portion of the permanent magnet 3, a central portion between a tooth 25a13 and a tooth 25a14 or a slot 26a13 of the armature iron core 1 is positioned.

A second position relationship is shown in FIG. 4B. Namely, with respect to one end portion of the permanent magnet 2, a center of the tooth 25a1 of the armature iron core 1 is positioned. With respect to another end portion of the permanent magnet 2, a middle portion between a tooth 25a6 and the tooth 25a7 or a slot 26a6 of the armature iron core 1 is positioned. Besides, with respect to one end portion of the permanent magnet 3, a middle portion between the tooth 25a7 and the tooth 25a8 or a slot 26a7 of the armature iron core 1 is positioned. With respect to another end portion of the permanent magnet 3, a middle portion between a tooth 25a12 and the tooth 25a13 or a slot 26a12 of the armature iron core 1 is positioned.

A third position relationship is shown in FIG. 4C. Namely, with respect to one end portion of the permanent magnet 2, a center of a tooth 25a14 of the armature iron core 1 is positioned. With respect to another end portion of the permanent magnet 2, a central portion between the tooth 25a5 and a tooth 25a6 or a slot 26a5 of the armature iron core 1 is positioned. Besides, with respect to one end portion of the permanent magnet 3, a middle portion between a tooth 25a6 and a tooth 25a7 or a slot 26a6 of the armature iron core 1 is positioned. With respect to another end portion of the permanent magnet 3, a center of a tooth 25a12 of the armature iron core 1 is positioned.

The cogging torque is generated by the change in the magnetic flux. The change the magnetic flux is caused between during the passing of the tooth 25 of the armature iron core 1 at both end portions of the rotation directions in the armature of the permanent magnets 2 and 3 and during the passing of the slots 26 adjacent to two teeth 25 of the armature iron core 1 of the permanent magnets 2 and 3.

Figure 5:
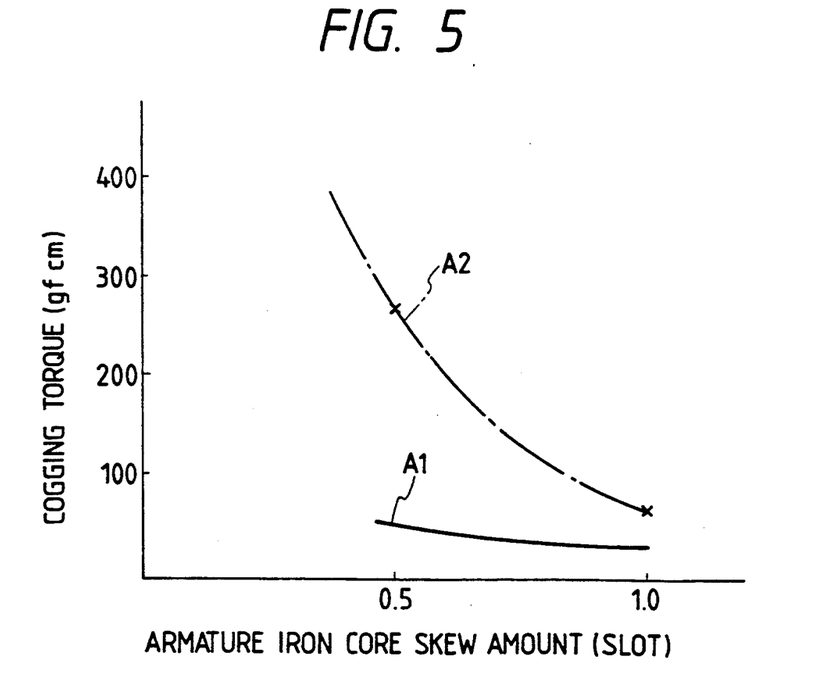
FIG. 5 is a graph showing a measurement example between the armature iron core skew amount and the cogging torque amount according to the present invention and the prior art.

FIG. 5 shows measurement values of the cogging torque in the permanent-magnetic motor 9 in a case where the installing pitch of the above stated permanent magnet field pole is made to have the inequal pitch and the center of the permanent magnet field pole is shifted against the mechanical center line 6 of the motor 9.

In FIG. 5, a solid curve line A1 indicates the cogging torque of the above stated embodiment according to the present invention, in which both the permanent magnet field poles are installed with the unequal pitch structure and both the center lines of the permanent magnets 2 and 3 are shifted against the mechanical center line 6 of the permanent-magnetic motor 9. A one-dot chain curve line A2 indicates the cogging torque according to the prior art in which the permanent-magnetic motor comprises the unequal gap structure and is installed with the equal pitch structure and also any one of the center lines of the permanent magnets is not shifted against the mechanical center line of the permanent-magnetic motor.

In this structure, the cogging torque in the permanent-magnetic motor 9 can be restrained at about 30 gfcm degree by using the one slot pitch skew method and the inequal gap method together. The cogging torque in the permanent-magnetic motor 9 in this embodiment according to the present invention can be reduced effectively in comparison with the conventional technique.

Further, by the disposition of the permanent magnet field pole having the unequal installing pitch in this embodiment according to the present invention, even if a skew of 0.5 slot pitch is employed, for example, the cogging torque in the permanent-magnetic motor 9 can be lowered more than the conventional one slot pitch skew structure having no inequal pitch method for installing the permanent magnets 2 and 3.

For example, according to the present invention, since the armature iron core 1 has fourteen (14) slots 26, only one of the permanent magnets 2 and 3 is shifted by 0.5 slot pitch. In other words, the permanent magnet 2 or 3 is shifted by $(360°/14) \times 0.5 = 12.9°$ from the mechanical center line 6 of the motor 9.

Next, another embodiment of a permanent-magnetic motor according to the present invention will be explained referring to drawing. FIG. 6 is a cross-sectional view showing the armature having one shifted permanent magnet 2.

As shown in FIG. 6, both end portions 27a1 and 27a2 of the permanent magnet 2 are disposed on the teeth 25 of the armature iron core 1, however both end portions 28a1 and 28a2 of the permanent magnet 3 having a reverse polarity (S pole) are positioned exactly on the above of the slot 26.

In this embodiment of the present invention, only the permanent magnet 2 is shifted by 0.5 slot pitch against the mechanical center line 6 of the permanent-magnetic motor 9, however another permanent magnet 3 is installed with the equal pitch structure and is not shifted against the mechanical center line 6 of the permanent-magnetic motor 9.

Namely, the permanent-magnetic motor 9 has fourteen (14) slots, and only one of the permanent magnet 2 is shifted by 0.5 slot pitch namely $\theta 3 = (360°/14) \times 0.5 = 12.9°$ from the mechanical center line of the motor 9.

When only one permanent magnet 2 is shifted as shown in FIG. 6, the performance difference between the normal rotation in the motor 9 and the reverse rotation in the permanent-magnetic motor 9 becomes large.

A large amount of skew is disadvantageous in the process of manufacturing an electric motor. A high performance electric motor can be manufactured with a high productivity by using the unequal pitch method for installing the permanent magnet field pole in a simple manufacturing process using a small amount of skew.

In the above stated embodiment according to the present invention, the permanent-magnetic motor having two pole is explained, however the structure according to the present invention can be applied to the electric motor having four poles or the multipolar electric motor having more than four poles.

Further, in the permanent-magnetic motor according to the present invention, since the fluctuation of the magnetic field accompanied with the rotation of the armature can be restrained, not only the cogging torque at a time of no electric current supply but also the pulsatory motion of the output torque at a time of the electric current supply can be reduced.

Accordingly, as the utilization field for the permanent-magnetic motor according to the present invention, it is possible to apply to not only the electric driven power steering apparatus but also an apparatus in which the low cogging torque or the low torque pulsatory motion at a time of the electric current supply is required.

We claim:

1. A permanent-magnetic motor comprising:
   a yoke;
   an armature iron core disposed in the yoke, the armature iron core having a plurality of teeth and a plurality of slots; and
   a plurality of permanent magnets disposed around the armature iron core;
   wherein the plurality of permanent magnets include a pair of permanent magnets disposed on opposite sides of the armature iron core, and wherein the pair of permanent magnets are disposed such that a center line of each permanent magnet of the pair of permanent magnets is rotationally shifted with respect to a mechanical center line of the permanent-magnetic motor to reduce a cogging torque caused by the pair of permanent magnets; and
   wherein the plurality of permanent magnets are disposed such that a distance from end portions of the permanent magnets to a rotational axis of the armature iron core is larger than a distance from center portions of the permanent magnets to the rotational axis of the armature core, thereby forming a non-uniform gap between each of the permanent magnets and the armature iron core.

2. A permanent-magnetic motor comprising:
   a yoke;

an armature iron core disposed in the yoke, the armature iron core having a plurality of teeth and a plurality of slots; and a plurality of permanent magnets disposed around the armature iron core such that a non-uniform gap is formed between each of the permanent magnets and the armature iron core;

wherein the plurality of permanent magnets include a pair of permanent magnets disposed on opposite sides of the armature iron core, an wherein at least one permanent magnet of the pair of permanent magnets is disposed such that a center line of the one permanent magnet is rotationally shifted with respect to a mechanical center line of the permanent-magnetic motor to reduce a cogging torque caused by the pair of permanent magnets.

3. A permanent-magnetic motor according to claim 2, wherein the teeth of the armature iron core are skewed with respect to a rotational axis of the armature iron core.

4. A permanent-magnetic motor according to claim 3, wherein the plurality of permanent magnets are disposed around the armature iron core such tat a distance from end portions of the permanent magnets to the rotational axis of the armature iron core is larger than a distance from center portions of the permanent magnets to the rotational axis of the armature iron core, thereby forming the non-uniform gap between each of the permanent magnets and the armature iron core.

5. A permanent-magnetic motor according to claim 2, wherein the plurality of permanent magnets are disposed around the armature iron core such that a distance from end portions of the permanent magnets to a rotational axis of the armature iron core is larger than a distance from center portions of the permanent magnets to the rotational axis of the armature iron core, thereby forming the non-uniform gap between each of the permanent magnets and the armature iron core.

6. A permanent-magnetic motor comprising:

a yoke;

an armature iron core disposed int eh yoke, the armature iron core having a plurality of teeth and a plurality of slots, the teeth of the armature iron core being skewed with respect to a rotational axis of the permanent-magnetic motor; and a plurality of permanent magnets disposed around the armature iron core such hat a non-uniform gap is formed between each of the permanent magnets and the armature iron core;

wherein the plurality of permanent magnets include a pair of permanent magnets disposed on opposite sides of the armature iron core, and wherein at least one permanent magnet of the pair of permanent magnets is disposed such that a center line of the one permanent magnet is rotationally shifted with respect to a mechanical center line of the permanent-magnetic motor to reduce a cogging torque caused by the pair of permanent magnets.

7. A two-pole permanent-magnetic motor comprising:

a yoke;

an armature iron core disposed in the yoke, the armature iron core having a plurality of teeth and a plurality of slots, the teeth of the armature iron core being skewed with respect to a rotational axis of the armature iron core; and two permanent magnets disposed on opposite sides of the armature iron core such that a non-uniform gap is formed between each of the permanent magnets and the armature iron core;

wherein the two permanent magnets are disposed such that a center line of each of the permanent magnets is rotationally shifted with respect to a mechanical center line of the two-pole permanent-magnetic motor to reduce a cogging torque caused by the two permanent magnets.

8. A two-pole permanent-magnetic motor according to claim 7, wherein the slots of the armature iron core are disposed at a predetermined slot pitch, wherein the teeth of the armature iron core are each skewed by an amount equal to the slot pitch, and wherein the two permanent magnets are disposed such that the center line of each of the permanent magnets is rotationally shifted with respect to the mechanical center line of the two-pole permanent-magnetic motor by an amount equal to one-quarter of the slot pitch.

9. A two-pole permanent-magnetic motor comprising:

a yoke;

an armature iron core disposed in the yoke, the armature iron core having a plurality of teeth and a plurality of slots, the teeth being skewed with respect to a rotational axis of the armature iron core; and two permanent magnets disposed on opposite sides of the armature iron core such that a non-uniform gap is formed between each of the permanent magnets and the armature iron core;

wherein one permanent magnet of the two permanent magnets is disposed such that a center line of the one permanent magnet is rotationally shifted with respect to a mechanical center line of the two-pole permanent-magnetic motor to reduce a cogging torque caused by the two permanent magnets.

10. A two-pole permanent-magnetic motor according to claim 9, wherein the slots of the armature iron core are disposed at a predetermined slot pitch, wherein the teeth of the armature iron core are each skewed by an amount equal to the slot pitch, and wherein the one permanent magnet is disposed such that the center line of the one permanent magnet is rotationally shifted with respect to the mechanical center line of the two-pole permanent-magnetic motor by an amount equal to one-half the slot pitch.

* * * * *